United States Patent
Kirchner et al.

(10) Patent No.: US 11,861,469 B2
(45) Date of Patent: Jan. 2, 2024

(54) CODE GENERATION FOR AUTO-AI

(71) Applicant: INTERNATIONAL BUSINESS MACHINES CORPORATION, Armonk, NY (US)

(72) Inventors: Peter Daniel Kirchner, Putnam Valley, NY (US); Gregory Bramble, Larchmont, NY (US); Horst Cornelius Samulowitz, White Plains, NY (US); Dakuo Wang, Cambridge, MA (US); Arunima Chaudhary, Boston, MA (US); Gregory Filla, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 16/919,258

(22) Filed: Jul. 2, 2020

(65) Prior Publication Data
US 2022/0004914 A1    Jan. 6, 2022

(51) Int. Cl.
*G06N 20/00*    (2019.01)
*G06F 8/35*    (2018.01)
*G06F 8/76*    (2018.01)

(52) U.S. Cl.
CPC .............. *G06N 20/00* (2019.01); *G06F 8/35* (2013.01); *G06F 8/76* (2013.01)

(58) Field of Classification Search
CPC .............. G06N 20/00; G06F 8/35; G06F 8/76
See application file for complete search history.

(56) References Cited

U.S. PATENT DOCUMENTS

| | | | |
|---|---|---|---|
| 10,360,214 B2 | 7/2019 | Gold | |
| 11,169,798 B1* | 11/2021 | Palmer | G06F 16/9024 |
| 2018/0225391 A1* | 8/2018 | Sali | G06F 7/588 |

(Continued)

FOREIGN PATENT DOCUMENTS

CN        110110858 A    8/2019

OTHER PUBLICATIONS

Billman, et. al., "Automated Discovery in Managerial Problem Formulation: Formation of Causal Hypotheses for Cognitive Mapping" Decision Sciences: A Journal of the Decision Sciences Institue, Jan. 1993 [accessed on May 15, 2020], pp. 23-41, vol. 24, Issue 1, Retrieved from the Internet: <URL: https://onlinelibrary.wiley.com/doi/abs/10.1111/j.1540-5915.1993.tb00460.x>.

(Continued)

*Primary Examiner* — Shirley X Zhang
(74) *Attorney, Agent, or Firm* — Andre Adkins

(57) ABSTRACT

An embodiment of the invention may include a method, computer program product, and system for creating a data analysis tool. The method may include a computing device that generates an AI pipeline based on an input dataset, wherein the AI pipeline is generated using an Automated Machine Learning program. The method may include converting the AI pipeline to a non-native format of the Automated Machine Learning program. This may enable the AI pipeline to be used outside of the Automated Machine Learning program, thereby increasing the usefulness of the created program by not tying it to the Automated Machine Learning program. Additionally, this may increase the efficiency of running the AI pipeline by eliminating unnecessary computations performed by the Automated Machine Learning program.

24 Claims, 7 Drawing Sheets

(56) References Cited

U.S. PATENT DOCUMENTS

| | | | |
|---|---|---|---|
| 2019/0317805 A1* | 10/2019 | Metsch | G06F 9/4881 |
| 2019/0392547 A1* | 12/2019 | Katouzian | G06V 20/62 |
| 2020/0012500 A1* | 1/2020 | Kern | G06N 20/00 |
| 2020/0019888 A1 | 1/2020 | McCourt | |
| 2020/0272909 A1* | 8/2020 | Parmentier | G06N 20/00 |
| 2021/0081848 A1* | 3/2021 | Polleri | G06N 20/20 |
| 2021/0097444 A1* | 4/2021 | Bansal | G06F 9/5066 |
| 2021/0109487 A1* | 4/2021 | Iyer | G05B 13/0265 |
| 2021/0133620 A1* | 5/2021 | Frank | G06N 3/0454 |
| 2021/0241088 A1* | 8/2021 | Fong | G06N 20/00 |
| 2021/0326736 A1* | 10/2021 | Kishimoto | G06F 18/217 |
| 2022/0004914 A1* | 1/2022 | Kirchner | G06F 8/35 |
| 2022/0036232 A1* | 2/2022 | Patel | G06F 8/60 |
| 2022/0051049 A1* | 2/2022 | Wang | G06N 20/20 |
| 2022/0207349 A1* | 6/2022 | Fusco | G06N 20/00 |
| 2022/0327058 A1* | 10/2022 | Vu | G06F 12/0862 |
| 2022/0343207 A1* | 10/2022 | Vu | G06N 5/04 |

OTHER PUBLICATIONS

Dozaral, et al., "Trust in AutoML: Exploring Information Needs for Establishing Trust in Automated Machine Learning Systems," IUI '20: Proceedings of the 25th International Conference on Intelligent User Interfaces, Mar. 2020 [accessed on May 15, 2020], pp. 297-307, Retrieved from the Internet: <URL: https://dl.acm.org/doi/abs/10.1145/3377325.3377501>.

Fursin, et al., "A Collective Knowledge Workflow for Collaborative Research into Multi-Objective Autotuning and Machine Learning Techniques," arXiv preprint, Jan. 19, 2018, 50 pages, Retrieved from the Internet: <URL: https://arxiv.org/pdf/1801.08024.pdf>.

Grace Period Disclosure, IBM Watson, "AutoAI Overview," Apr. 13, 2020 [accessed on May 6, 2020], 3 pages, Retrieved from the Internet <URL: https://dataplatform.cloud.ibm.com/docs/content/wsj/analyze-data/autoai-overview.html>.

He, et al., "AMC: AutoML for Model Compression and Acceleration on Mobile Devices," The European Conference on Computer Vision (ECCV), 2018 [accessed on May 15, 2020], pp. 784-800, Retrieved from the Internet: <URL: http://openaccess.thecvf.com/content_ECCV_2018/html/Yihui_He_AMC_Automated_Model_ECCV_2018_paper.html>.

Huang, et al., "A novel virtual node approach for interactive visual analytics of big datasets in parallel coordinates," Future Generation Computer Systems, 2015, 14 pages, Retrieved from the Internet: <URL: http://dx.doi.org/10.1016/j.future.2015.02.003>.

Mell, et al., "The NIST Definition of Cloud Computing", National Institute of Standards and Technology, Special Publication 800-145, Sep. 2011, 7 pages.

Milutinovic, "Towards Automatic Machine Learning Pipeline Design," UC Berkeley Electronic Theses and Dissertations, 2019, 104 pages, Retrieved from the Internet: <URL: https://escholarship.org/uc/item/2163j1c4>.

Pending U.S. Appl. No. 16/551,021, entitled "Natural Language Interaction With Automated Machine Learning Systems", filed Aug. 26, 2019, 29 Pages.

Pending U.S. Appl. No. 16/557,760, entitled "Automated Artificial Intelligence Radial Visualization", filed Aug. 30, 2019, 73 Pages.

Pending U.S. Appl. No. 16/805,019 , entitled "Personalized Automated Machine Learning", filed Feb. 28, 2020, 26 Pages.

Pending U.S. Appl. No. 16/806,626 , entitled "Transfer Learning Across Automated Machine Learning Systems", filed Mar. 2, 2020, 50 Pages.

Pending U.S. Appl. No. 16/832,528 , entitled "Conditional Parallel Coordinates in Automated Artificial Intelligence With Constraints", filed Mar. 27, 2020, 61 Pages.

Wang, et al., "AutoAI: Automating the End-to-End AI Lifecycle with Humans-in-the-Loop," IUI '20: Proceedings of the 25th International Conference on Intelligent User Interfaces Companion, Mar. 2020 [accessed on May 15, 2020], pp. 77-78, Retrieved from the Internet: <URL: https://dl.acm.org/doi/abs/10.1145/3379336.3381474>.

Weidele, et al., "AutoAIViz: Opening the Blackbox of Automated Artificial Intelligence with Conditional Parallel Coordinates," IBM Research, Jan. 17, 2020, 5 pages.

* cited by examiner

CODE GENERATION FOR AUTO-AI

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURES: "IBM Watson Studio AutoAI (beta)," Wang, et al. 3/25/2020; "AutoAI Overview" Wang, et al. 4/13/2020.

BACKGROUND

The present invention relates to machine learning models, and more specifically, to automated machine learning.

Automated machine learning (AutoML) or automated artificial intelligence (Auto-AI) is the process of automating the process of applying machine learning to real-world problems. AutoML covers the complete pipeline from the raw dataset to the deployable machine learning model. AutoML was proposed as an artificial intelligence-based solution to the ever-growing challenge of applying machine learning. The high degree of automation in AutoML allows non-experts to make use of machine learning models and techniques without requiring them to become an expert in this field first.

Automating the process of applying machine learning end-to-end additionally offers the advantages of producing simpler solutions, faster creation of those solutions, and models that often outperform hand-designed models.

BRIEF SUMMARY

An embodiment of the invention may include a method, computer program product, and system for creating a data analysis tool. The method may include a computing device that generates an AI pipeline based on an input dataset, wherein the AI pipeline is generated using an Automated Machine Learning program. The method may include converting the AI pipeline to a non-native format of the Automated Machine Learning program. This may enable the AI pipeline to be used outside of the Automated Machine Learning program, thereby increasing the usefulness of the created program by not tying it to the Automated Machine Learning program. Additionally, this may increase the efficiency of running the AI pipeline by eliminating unnecessary computations performed by the Automated Machine Learning program.

In another embodiment, the non-native format is an executable format capable of being executed outside of the Automated Machine Learning program. This may enable the AI pipeline to be used outside of the Automated Machine Learning program, thereby increasing the usefulness of the created program by not tying it to the Automated Machine Learning program. Additionally, this may increase the efficiency of running the AI pipeline by eliminating unnecessary computations performed by the Automated Machine Learning program.

In another embodiment, at least a portion of the non-native format comprises a general-purpose programming language. This may enable the AI pipeline to be used outside of the Automated Machine Learning program, thereby increasing the usefulness of the created program by not tying it to the Automated Machine Learning program. Additionally, this may increase the efficiency of running the AI pipeline by eliminating unnecessary computations performed by the Automated Machine Learning program. Also, this may enable a user to view and edit code generated for the AI pipeline, giving the user additional confidence in the AI pipeline created by the Automated Machine Learning program as well as enabling the user to create modifications.

In another embodiment, the method may include displaying the non-native format to a user. the method may include receiving modifications to the non-native format from the user. the method may include executing the modified non-native format in the Automated Machine Learning program. This may enable a user to view and edit code generated for the AI pipeline, giving the user additional confidence in the AI pipeline created by the Automated Machine Learning program as well as enabling the user to create modifications.

In another embodiment, executing the modified non-native format in the Automated Machine Learning program creates a model evaluation for the AI pipeline in the modified non-native format. This may enable a user to view and edit code generated for the AI pipeline, giving the user additional confidence in the AI pipeline created by the Automated Machine Learning program as well as enabling the user to create modifications and compare those modifications to other generated AI pipelines.

In another embodiment, the method may include updating an AI model of the Automated Machine Learning program based on the modified non-native format. This may allow the AI model to learn subtle programming differences that may impact performance, and aid in future generation of AI pipelines created by the Automated Machine Learning program.

In another embodiment, the method may include exporting the modified non-native format. This may enable the AI pipeline to be used outside of the Automated Machine Learning program, thereby increasing the usefulness of the created program by not tying it to the Automated Machine Learning program. Additionally, this may increase the efficiency of running the AI pipeline by eliminating unnecessary computations performed by the Automated Machine Learning program.

In another embodiment, converting the AI pipeline to the non-native format may use an AI model trained using at least the modified non-native format. This may enable the AI pipeline to be used outside of the Automated Machine Learning program, thereby increasing the usefulness of the created program by not tying it to the Automated Machine Learning program. Additionally, this may increase the efficiency of running the AI pipeline by eliminating unnecessary computations performed by the Automated Machine Learning program. This may allow the AI model to implement subtle programming differences that may impact performance.

DETAILED DESCRIPTION

Figure 1:
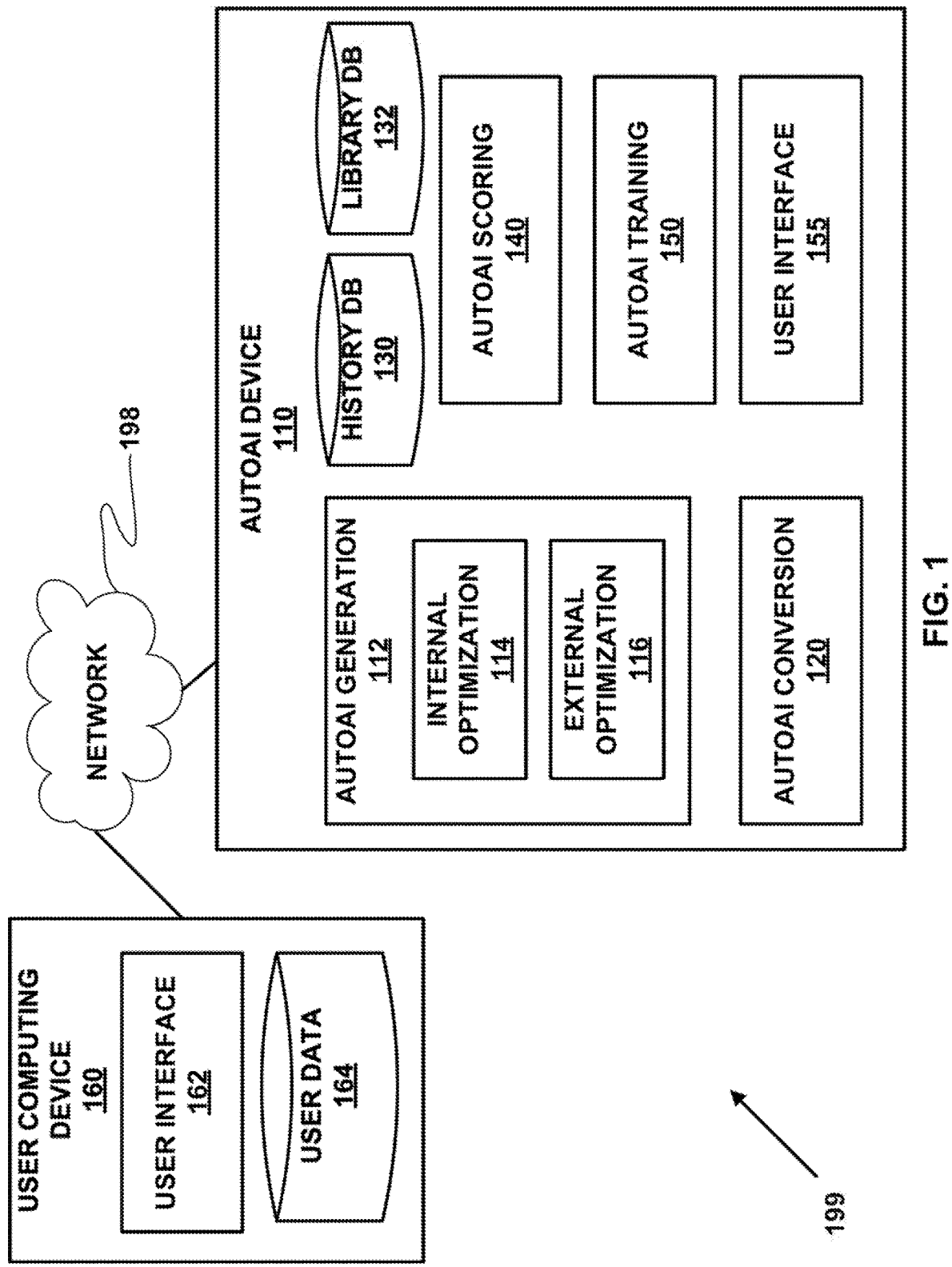
FIG. 1 illustrates an auto-AI system, in accordance with an embodiment of the invention.

Embodiments of the present invention will now be described in detail with reference to the accompanying Figures.

Auto-AI or AutoML systems allow developers, ranging from highly trained data scientist to novices using AI or ML systems for the first time, to implement a range of different solutions that suit the needs of the problem to be solved. During implementation, Auto-AI systems may develop multiple AI pipelines, which may be compared and selected by a developer. Such AI pipelines may include some combination of preprocessing data (e.g., ingestion of data, tagging of data, classification of data, preparation of data), AI model (machine learning or deep learning models), and feature engineering (transforming an existing feature to a new feature, e.g., absolute(X)). And while these techniques may allow for a robust comparison of multiple pipelines in a shortened timeframe, limitations still exist that limit the uptake of this technology.

Human-Computer Interface (HCI) researchers have performed extensive work on understanding how data scientists work and how to design systems to better support them. For example, it is suggested that 80 percent of the time of a data science project is spent in data preparation. As a result, data scientists often do not have enough time to complete a comprehensive data analysis. Auto-AI systems focus mostly on the model building and data analysis tasks, with only a few exceptions that cover the data preparation tasks. Interactive machine learning research aims to design better user experiences for human users to enable more information to be provided to the machine learning tool. These are often labelers of a data sample or domain experts who have better domain knowledge that the machine learning model does not easily reflect. Alternatively, as outlined below, ease and trust of collaboration of data scientists with auto-AI to build models can greatly improve the HCI, making for more trusted and efficient overall system building. Many tools are built to support data scientists' work practices. For example, Jupyter® Notebook (Jupyter is a registered trademark of NumFOCUS, Inc.) and its variations such as Google® Colab (Google is a registered trademark of Google, LLC) and Jupyter-Lab are widely adopted by the data science community. These systems provide an easy code-and-test environment with a graphical user interface so that data scientists can quickly iterate their model crafting and testing process. Another group of tools includes the Data Voyager and TensorBoard® (TensorBoard is a registered trademark of Google, LLC) systems that provide visual analytic support to data scientists to explore their data, but they often stop in the data preparation stage and thus do not provide automated support for model building tasks. Auto-AI describes a group of technologies that can automate the manual processes required in the preprocessing of data, feature selection, model tuning, and model selection in the traditional data science workflow, so that it can support data scientists to work to generate insights from the dataset faster.

Despite the extensive work in building these AI systems, they mainly focus on data visualization, and do not focus on the interaction between humans and AI in the automated data science domain.

In the embodiments described below, an auto-AI system is described which may enable a mechanism to improve the HCI for data scientists and other users, and the auto-AI process in general by building a portable AI result that can be used outside of the framework of the auto-AI system, thereby reducing the amount of computational resources when these systems are run in tandem.

FIG. 1 illustrates the auto-AI system 199 for use in aiding the building of an AI pipeline for implementation in data analysis, in accordance with an embodiment of the invention. In an example embodiment, auto-AI system 199 includes an auto-AI device 110 and a user computing device 160 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the auto-AI device 110 and the user computing device 160.

User computing device 160 may include a user interface 162 and/or user data 164. User computing device 160 may be a desktop computer, a notebook, a laptop computer, a tablet computer, a handheld device, a smart-phone, a thin client, or any other electronic device or computing system capable of receiving and sending data to and from other computing devices such as auto-AI device 110 via network 198. The components of user computing device 160 are described in more detail with reference to FIG. 5.

User interface 162 includes components used to receive input from a user and transmit and display the results of auto-AI generation program 112 in order to facilitate the user's deployment of an AI pipeline. In an example embodiment, user interface 126 uses a combination of technologies and devices, such as device drivers, to provide a platform to enable users of computing device 110 to see displays of multiple pipelines, select a specific pipeline, and view parameters and comparisons of such pipelines. In the example embodiment, the user interface 162 may include application components to display the results of auto-AI building and evaluation, a code editor, and a kernel for executing code developed from the auto-AI. In an example embodiment, user interface 162 may be any Programming Console or Integrated Developer Environment, such as VSCode, Eclipse® (Eclipse® is a registered trademark of Eclipse Foundation), Jupyter® Notebook, Google® Colab, Jupyter®-Lab, Data Voyager and TensorBoard®, etc.

User data 164 is a data file containing information used to build and test an AI pipeline. User data 164 may contain structured and/or unstructured data. User data 164 may be any type of data that a user wants to perform data analysis on using machine learning or artificial intelligence techniques.

Auto-AI device 110 includes an Auto-AI generation program 112 having an external optimization module 116 and an internal optimization module 114, an auto-AI conversion program 120, a history database 130, a library database 132, an auto-AI scoring program 140, an auto-AI training program 150, and a user interface 155. In the example embodiment, auto-AI device 110 may include a cluster of servers, such as a cloud computing environment described in detail below in FIGS. 5 and 6, executing the same software to collectively process the actions in parallel. However, auto- AI device may be any computing device such as a desktop computer, a notebook or a laptop computer; a smart phone, a tablet computer, a handheld device, a thin client, or any other electronic device or computing system capable of receiving and sending data to and from user computing device 160 via network 198. The components of auto-AI device 110 is described in more detail with reference to FIG. 5.

History DB 130 is a database containing AI pipelines, the characteristics of the data for used to develop the AI pipeline, scores of the AI pipeline with the data, whether the AI pipeline was selected by a user, and any modifications to the AI pipeline by the user. Such data may for the basis for training the machine learning elements of the auto-AI generation program 112 and auto-AI conversion program 120.

Auto-AI scoring program 140 is a program that scores the performance of an AI pipeline. Auto-AI scoring program 140 may use any number of performance metrics to score the accuracy, precision, and any other relevant metrics in order to assess and rank each AI pipeline in comparison to each other, such as R2, F1, ROC AUC, and Precision scores.

Auto-AI generation program 112 includes an external optimization module 116 and an internal optimization module 114. Auto-AI generation program 112 is an automated machine learning program that is capable of generating one or more AI pipelines based on a dataset, such as user data 164. Auto-AI generation program 112 may leverage machine learning techniques to select and optimize elements of an AI pipeline based on scores of previously developed AI piplines contained in history database 30. In doing so, the internal optimization module 114 is a machine learning model trained to select components of an AI pipeline based on the type of data being evaluated, as well as statistical characteristics of the data that may lend itself to a specific element (e.g., model) or set of elements suited for the data. Internal optimization module 114 may compose a pipeline or a portion thereof by selecting from one or more libraries of transformers, feature unions, and estimators, to improve predictive performance. Once these elements are selected, external optimization module 116 may select additional components of the AI pipeline to provide additional optimization. External optimization module 116 may tune transformers and estimators which provide hyperparameter range information to a parameter optimizer. Each module may be trained by auto-AI training program 150 using the results contained in history DB 130.

Auto-AI training program 150 is a program that trains the machine learning algorithms used in external optimization module 116 and internal optimization module 114. Training for each model is based on the type of models and the information contained in history DB 130.

Library database 132 is a collection of libraries containing commands, sub-routines, classes, value and type specifications, and other code used in machine learning or artificial intelligence systems.

Auto-AI conversion program 120 converts an AI pipeline created by the auto-AI generation program 112 into a non-native format that may be operated and manipulated in an environment separate from the auto-AI device 110, and the components located on the auto-AI device. The non-native format may be in the form of source code or object code and may be exportable from the auto-AI device 110. In embodiments where the non-native format is in the form of source code, the code may use a general programming language such as, for example, Java® (Java® is a registered trademark of Oracle), C++, or Python® (Python® is a registered trademark of PSF).

User interface 155 is a program that works in conjunction with user interface 162 to display the AI pipelines created by auto-AI generation program 112, along with scores and metrics from auto-AI scoring program 140, and source code created by auto-AI conversion program 120.

Figure 2:
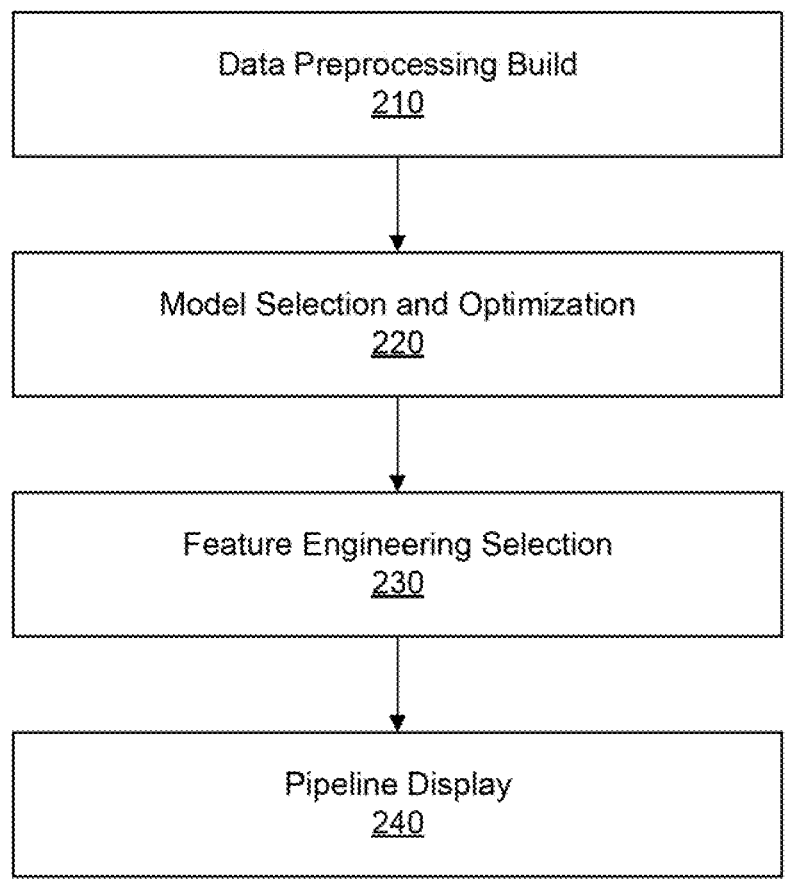
FIG. 2 is a flowchart illustrating the operations of the auto-AI generation program of FIG. 1, in accordance with an embodiment of the invention.

FIG. 2 is a flow chart illustrating a method of creating an AI pipeline using auto-AI generation program 112. The selection or determination in each step may be performed by a trained machine learning module of auto-AI generation program 112, which may be trained based on decisions made in performing each step and scores determined by auto-AI training program 150.

Referring to step 210, one or more methods/techniques for preprocessing data may be selected by a specifically trained AI module, such as internal optimization module 114, of auto-AI generation program 112, and these methods or techniques may make up a preprocessing element of an AI pipeline. A ground truth of the user data 164 may be determined. In embodiments where ground truths are not generated by the user, ground truth may be determined using statistical techniques such as k-means clustering, mixture models, hierarchical clustering, hidden Markov models, blind signal separation, self-organizing maps (SOMs), adaptive resonance theory (ART), and any other applicable methods. Such ground truth gathering may define a standard, or measuring stick, of the data contained in user data 164. Following ground truth determination, data cleansing of user data 164 may be performed with regards to the ground truth gathered in step 210. Cleansing of data may include removing outliers or biases included in the data based on the comparison of such data points to the ground truth. Following cleansing, additional data engineering may be performed in order to organize or classify the data into meaningful subsets that may be used in model training.

Referring to step 220, one or more methods/techniques may be selected by specifically trained AI module, such as internal optimization module 114, of auto-AI generation program 112, and these methods or techniques may make up a modeling element of an AI pipeline. One or more models may be selected by an AI module of auto-AI generation program 112 based on the results and methods used in creating the preprocessing element from steps 210. Auto-AI generation program 112 may use models such as, for example, Linear Regression, logistical Regression, Random Forest, Gradient Boosted Trees, Support Vector Machines (SVM), Neural Networks (including Convolutional Neural Networks and Deep Learning networks), Decision Trees, Naive Bayes, and Nearest Neighbor. The one or more models may undergo hyperparameters optimization for each of the one or more preprocessing elements of the AI pipeline based on the likelihood of success of such a combination based on an AI module of auto-AI generation program 112.

Referring to step 230, one or more methods/techniques may be selected by specifically trained AI module, such as external optimization module 116, of auto-AI generation program 112, and these methods or techniques may make up a feature engineering element of an AI pipeline. One or more transformers may be selected by an AI module of auto-AI generation program 112 based on the models created in step 220. Transformers may be used to convert the results of the model into a format that is easier for a user to decipher or scoring by auto-AI scoring program 140.

Referring to step 240, the selected and trained elements may be displayed to the user using a combination of user interface 162 and user interface 155. The display may score each of the AI pipelines created in steps 210 through 230 and display a ranking of the pipelines in order along with their score. Additionally, user interface 162 may display each AI pipeline element, and have an interface showing connections between each element (when applicable). User interface 162 may additionally have an interface element to enable a user to view and/or download a non-native format for each AI pipeline generated by auto-AI conversion program 120.

Figure 3:
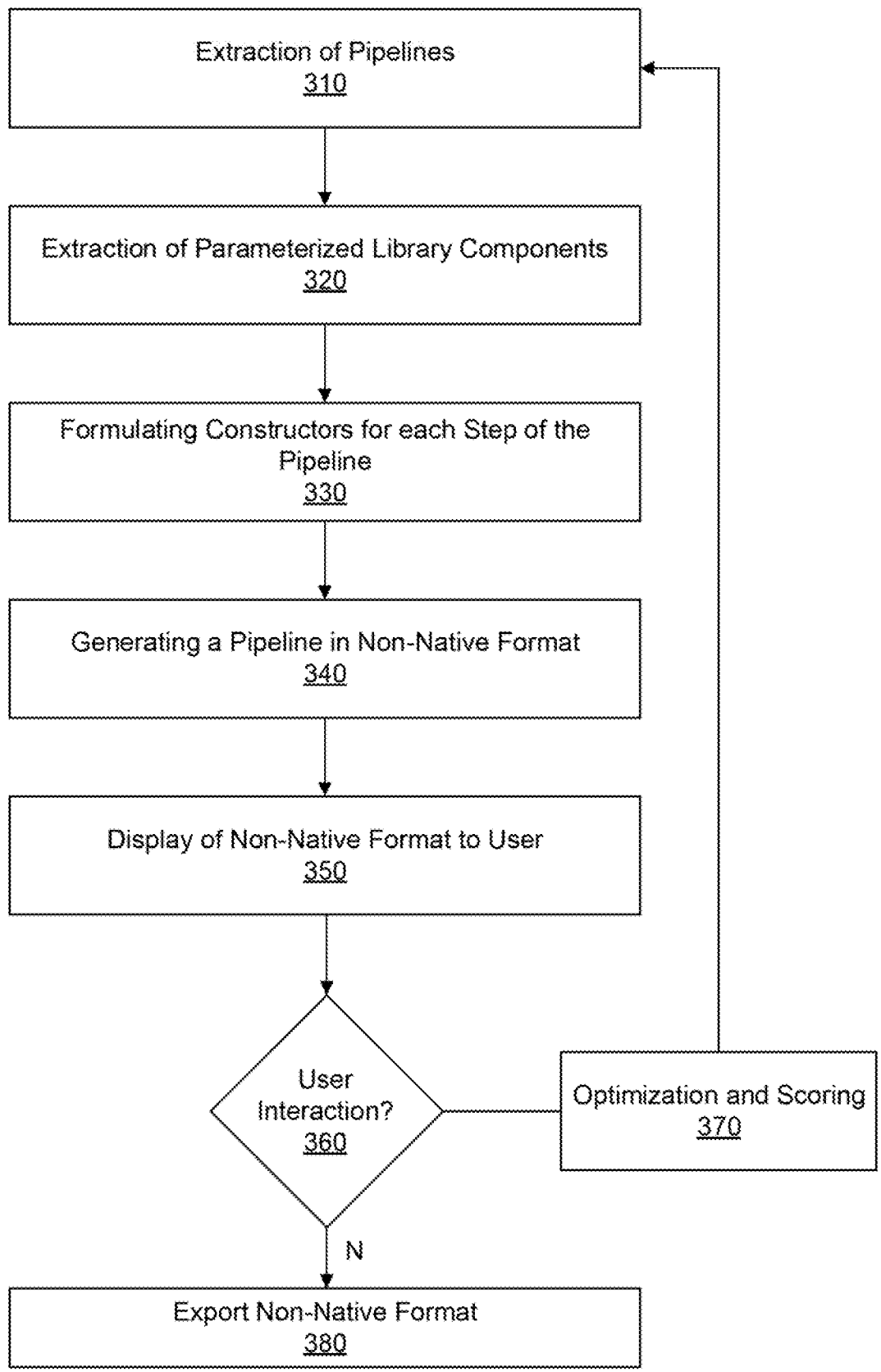
FIG. 3 is a flowchart illustrating the operations of the auto-AI scoring program of FIG. 1, in accordance with an embodiment of the invention.
Figure 4:
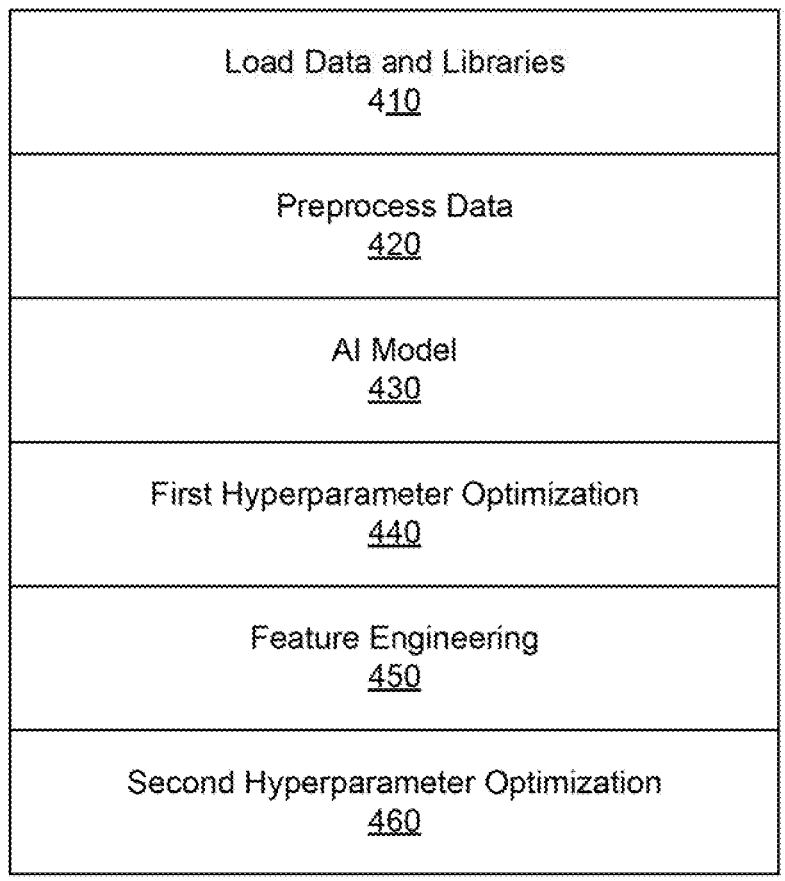
FIG. 4 is an example layout for constructors of an AI pipeline generated by the auto-AI scoring program, in accordance with an embodiment of the invention.

FIG. 3 is a flow chart illustrating a method used by auto-AI conversion program 120 to convert an AI pipeline generated by the auto-AI generation program 112 into a non-native format that can be implemented independent of the components of the auto-AI device 110. An example build layout of the non-native format is depicted in FIG. 4.

Referring to step 310, extraction of pipelines from auto-AI generation program 112 by auto-AI conversion program 120 may occur. Extraction of the pipeline retrieves each element (e.g., data preprocessing modules, AI models, transformer modules) from the AI pipeline created in steps 210-240. In extraction of the pipeline may include the models, transformers, and data preprocessing techniques chosen by auto-AI generation program 112, as well ordering of such elements.

Referring to step 320, auto-AI conversion program 120 may extract the hyperparameters determined for each element of the AI pipeline may be extracted.

Referring to step 330, auto-AI conversion program 120 may formulate the constructor for each step based on each of the extracted pipelines and the extracted hyperparameters. The formulated constructors may make up a portion of the non-native format, such as source code. Formulating the constructors may be performed through a combination of AI and non-AI techniques. For example, in an embodiment a shell may be constructed by inserting a form layout of constructors for the element. The form layout may include the constructors, function calls, or any code that may form a generic template for an element. The hyperparameters may be loaded or placed into the shell based on rules for such hyperparameters. In this embodiment, an AI code generation module may modify the source code for the created shell to conform with learned user modifications. The AI code generation module may be trained based on modifications made to the source code in conjunction with scores for the modified code determined by auto-AI scoring program 140. In another embodiment, an AI code generation module may create the source code without the aid of forms and the intermediate step of creating a shell. In another embodiment, auto-AI conversion program 120 may transition from using a form layout to just an AI code generation module based on training of the AI code generation module based on the form layout.

Referring to step 340, auto-AI conversion program 120 may generate an AI pipeline in the non-native format. Generation of the pipeline may be performed by ordering the constructors for each of the extracted elements based on the order used in auto-AI generation program 112 extracted in step 310. For example, the constructors for each pipeline may be ordered similarly to the constructed layout depicted in FIG. 4. In FIG. 4, the constructors are ordered having constructors to load of the libraries and data 410, constructors for the preprocessing elements 420, constructors for the AI model 430, constructors for a first optimization of the hyperparameters 440 of the AI model, constructors for feature engineering elements 450, and constructors for a second optimization hyperparameters 460 of the AI model and feature engineering elements. This is an example layout of a construction of a complete AI pipeline having at least constructor from each element, however constructors may be removed or added depending on the data contained in user data 164.

Referring to step 350, auto-AI conversion program 120 may display the non-native format to the user in a code editor using user interface 162 and user interface 155. The code editor may display the editable code used in non-native format of the AI pipeline to a user, which may allow the user to read and/or edit the code. Additionally, by allowing a user to interact with the code, it enables additional user confidence in the output of the auto-AI generation program 112. Specifically, the user may confirm that the generated code is acceptable, and if it is not acceptable the user may manipulate the code to suit their preferences.

Referring to step 360, auto-AI conversion program 120 may determine whether a user has edited the code. This determination may be made by comparing the code (or hashes of versions of the code) with each other to determine if any differences exist in what was originally created by the auto-AI conversion program 120 and what is currently displayed in the code editor. The determination may be made intermittently (e.g., based on time elapsed in editor, based an addition/deletion of a line of code) or on user prompt. If there is a change in the code, auto-AI conversion program 120 proceeds to step 380. If there is no change in the code, auto-AI conversion program 120 proceeds to step 380.

Referring to step 370, the newly created code may be evaluated similarly to each of the other AI pipelines by auto-AI generation program 112. For example, the newly created code may be optimized, scored, and displayed, using the processes outlined in steps 220 through 240. This may enable the user to compare the new code with each of the other auto-AI models using similar metrics. Additionally, scoring of the newly created code may be saved in history database 132 and fed back into the AI code generation module for training of the model.

Referring to step 380, auto-AI conversion program 120 may export the non-native format for use in an environment outside of the auto-AI generation program 112. Such an environment may be outside of the cloud environment in which the non-native format was originally constructed, or as a portion of an API in the cloud environment.

Figure 5:
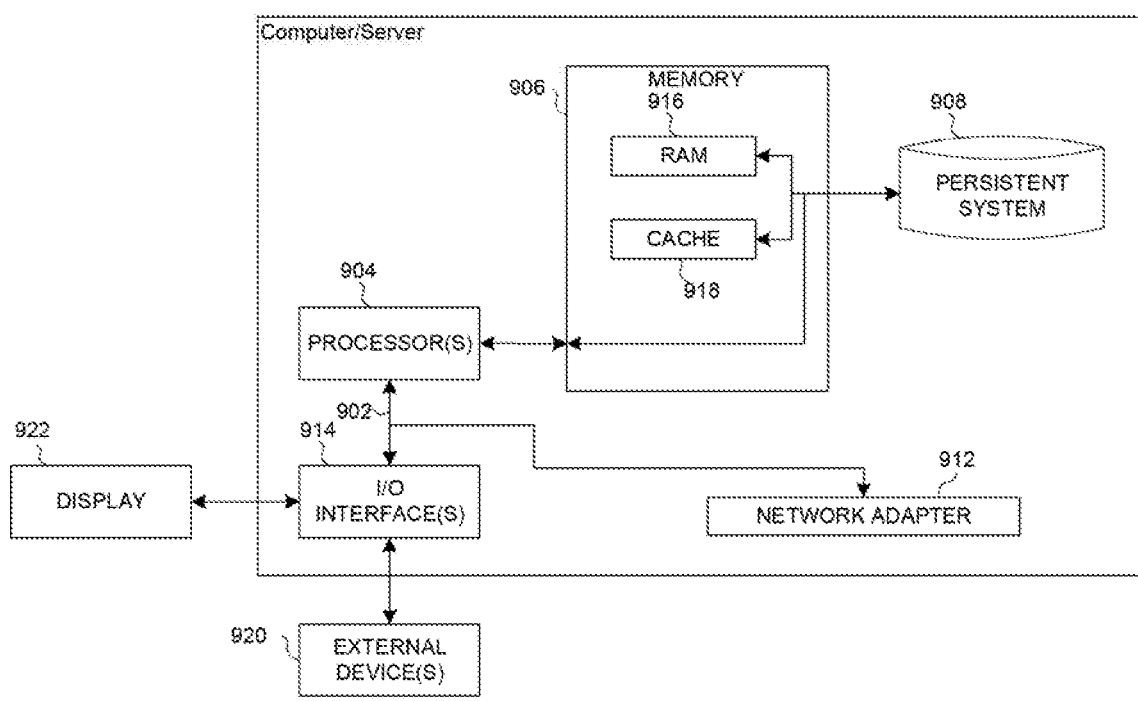
FIG. 5 is a block diagram depicting the hardware components of the auto-AI system of FIG. 1, in accordance with an embodiment of the invention.

FIG. 5 depicts a block diagram of components of auto-AI device 110 and user computing device 160, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made, and auto-AI device 110 and user computing device 160 may include multiple instances of the computer/server depicted, such as in the cloud computing environment described in FIG. 6 and FIG. 7.

Auto-AI device 110 and user computing device 160 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs auto-AI generation program 112, external optimization module 116, internal optimization module 114, auto-AI conversion program 120, auto-AI scoring program 140, auto-AI training program 150, and user interface 155 in auto-AI device 110; and user interface 162 in user computing device 160 are stored in persistent storage 908 for execution by one or more of the respective computer processors 904 via one or more memories of memory 906. The files history database 130 and library database 132 in auto-AI device 110; and user data 164 in user computing device 160 are stored in persistent storage 908. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The generation program 112, external optimization module 116, internal optimization module 114, auto-AI conversion program 120, auto-AI scoring program 140, auto-AI training program 150, user interface 155, history database 130, and library database 132 in auto-AI device 110; and user interface 162 and user data 164 in user computing device 160 may be downloaded to persistent storage 908 through communications unit 912.

I/O interface(s) 914 allows for input and output of data with other devices that may be connected to auto-AI device 110 and social media user computing device 160. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., The generation program 112, external optimization module 116, internal optimization module 114, auto-AI conversion program 120, auto-AI scoring program 140, auto-AI training program 150, user interface 155, history database 130, and library database 132 in auto-AI device 110; and user interface 162 and user data 164 in user computing device 160 can be stored on such portable computer-readable storage media and can be loaded onto persistent storage 908 via I/O interface(s) 914. I/O interface (s) 914 can also connect to a display 922.

Display 922 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
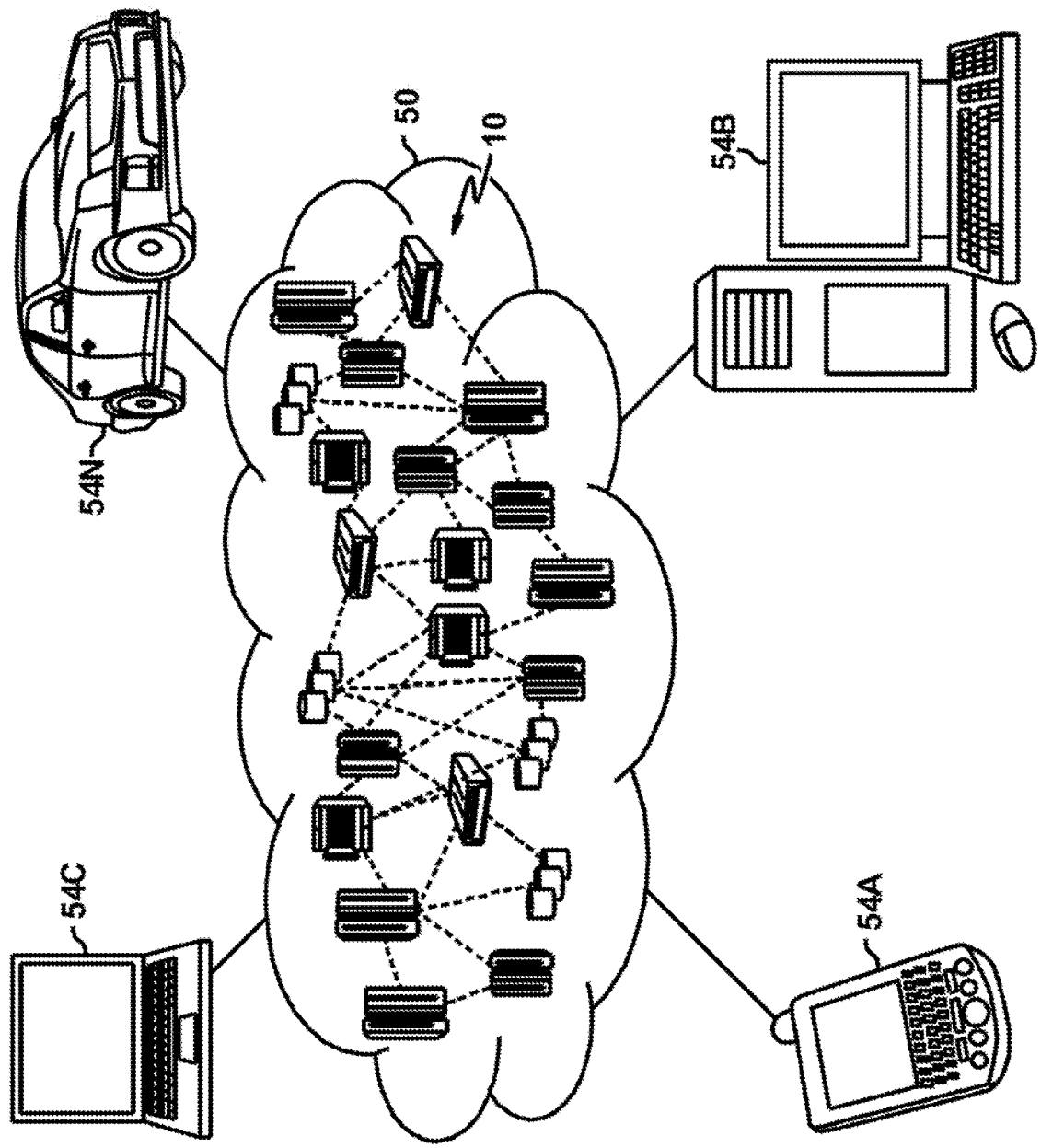
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
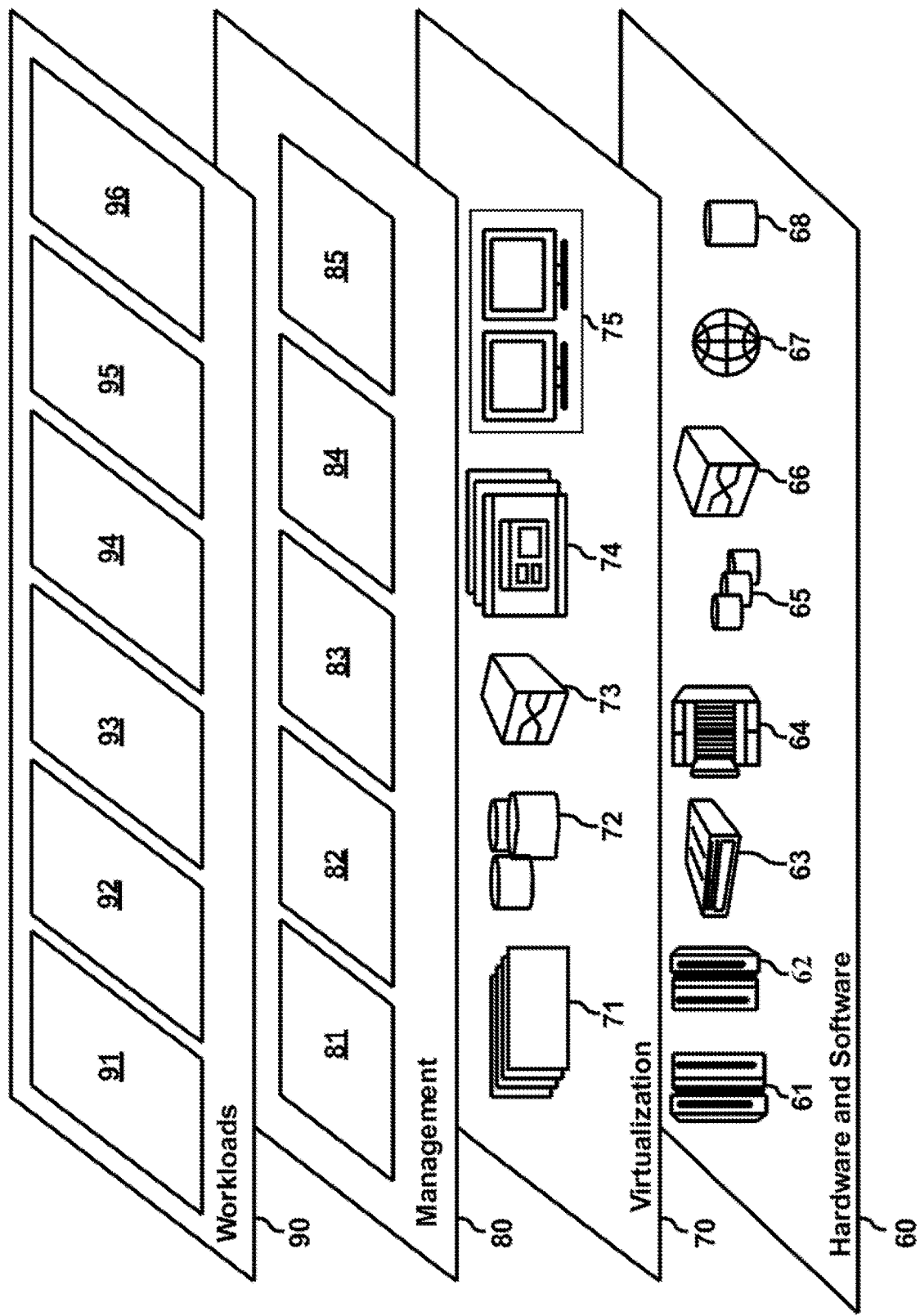
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Auto-AI program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps.

Furthermore, steps of the method may be performed in parallel to perform their described functionality.

What is claimed is:

1. A method for creating a data analysis tool, the method comprising:
   generating an AI pipeline based on an input dataset, wherein the AI pipeline is generated using an Automated Machine Learning program;
   optimizing the AI pipeline based on scoring of previous AI pipelines associated with the AI pipeline;
   converting the AI pipeline to a non-native format of the Automated Machine Learning program; and
   displaying a ranking of the AI pipeline along with an associated score from the scoring.

2. The method of claim 1, wherein the non-native format is an executable format capable of being executed outside of the Automated Machine Learning program.

3. The method of claim 2, wherein at least a portion of the non-native format comprises a general-purpose programming language.

4. The method of claim 1 further comprising:
   displaying the non-native format to a user;
   receiving modifications to the non-native format from the user; and
   executing the modified non-native format in the Automated Machine Learning program.

5. The method of claim 4, wherein executing the modified non-native format in the Automated Machine Learning program creates a model evaluation for the AI pipeline in the modified non-native format.

6. The method of claim 4 further comprising updating an AI model of the Automated Machine Learning program based on the modified non-native format.

7. The method of claim 4 further comprising exporting the modified non-native format.

8. The method of claim 4, wherein converting the AI pipeline to the non-native format comprises using an AI model trained using at least the modified non-native format.

9. A computer program product for creating a data analysis tool, the computer program product comprising:
   one or more non-transitory computer readable storage media, and program instructions collectively stored on the one or more non-transitory computer readable storage media, the program instructions comprising:
   program instructions to generate an AI pipeline based on an input dataset, wherein the AI pipeline is generated using an Automated Machine Learning program;
   program instructions to optimize the AI pipeline based on scoring of previous AI pipelines associated with the AI pipeline;
   program instructions to convert the AI pipeline to a non-native format of the Automated Machine Learning program; and
   program instructions to display a ranking of the AI pipeline along with an associated score from the scoring.

10. The computer program product of claim 9, wherein the non-native format is an executable format capable of being executed outside of the Automated Machine Learning program.

11. The computer program product of claim 10, wherein at least a portion of the non-native format comprises a general-purpose programming language.

12. The computer program product of claim 9 further comprising:
   program instructions to display the non-native format to a user;
   program instructions to receive modifications to the non-native format from the user; and
   program instructions to execute the modified non-native format in the Automated Machine Learning program.

13. The computer program product of claim 12, wherein the program instructions to execute the modified non-native format in the Automated Machine Learning program creates a model evaluation for the AI pipeline in the modified non-native format.

14. The computer program product of claim 12 further comprising program instructions to update an AI model of the Automated Machine Learning program based on the modified non-native format.

15. The computer program product of claim 12 further comprising program instructions to export the modified non-native format.

16. The computer program product of claim 12, wherein the program instructions to convert the AI pipeline to the non-native format comprises using an AI model trained using at least the modified non-native format.

17. A computer system for creating a data analysis tool, the computer system comprising:
   one or more processors, one or more computer-readable memories, one or more computer-readable storage devices, and program instructions stored on at least one of the one or more computer-readable storage devices for execution by at least one of the one or more processors via at least one of the one or more computer-readable memories, the program instructions comprising:
   program instructions to generate an AI pipeline based on an input dataset, wherein the AI pipeline is generated using an Automated Machine Learning program;
   program instructions to optimize the AI pipeline based on scoring of previous AI pipelines associated with the AI pipeline;
   program instructions to convert the AI pipeline to a non-native format of the Automated Machine Learning program; and
   program instructions to display a ranking of the AI pipeline along with an associated score from the scoring.

18. The computer system of claim 17, wherein the non-native format is an executable format capable of being executed outside of the Automated Machine Learning program.

19. The computer system of claim 18, wherein at least a portion of the non-native format comprises a general-purpose programming language.

20. The computer system of claim 19 further comprising:
   program instructions to display the non-native format to a user;
   program instructions to receive modifications to the non-native format from the user; and
   program instructions to execute the modified non-native format in the Automated Machine Learning program.

21. The computer system of claim 20, wherein the program instructions to execute the modified non-native format in the Automated Machine Learning program creates a model evaluation for the AI pipeline in the modified non-native format.

22. The computer system of claim 20 further comprising program instructions to update an AI model of the Automated Machine Learning program based on the modified non-native format.

23. The computer system of claim 20 further comprising program instructions to export the modified non-native format.

24. The computer system of claim 20, wherein the program instructions to convert the AI pipeline to the non-native format comprises using an AI model trained using at least the modified non-native format.

\* \* \* \* \*